United States Patent [19]

Inoue

[11] E Re. 29,589

[45] Reissued Mar. 21, 1978

[54] ELECTRICAL DISCHARGE MACHINING PULSE CONTROL METHOD AND APPARATUS

[76] Inventor: Kiyoshi Inoue, 100 Sakato, Kawasaki, Kanagawa, Tokyo, Japan

[21] Appl. No.: 296,946

[22] Filed: Oct. 12, 1972

Related U.S. Patent Documents

Reissue of:

[64] Patent No.: 3,539,755
Issued: Nov. 10, 1970
Appl. No.: 682,824
Filed: Nov. 14, 1967

U.S. Applications:

[63] Continuation-in-part of Ser. No. 493,473, Oct. 6, 1965, Pat. No. 3,360,683.

[51] Int. Cl.[2] ..... B23P 1/08

[52] U.S. Cl. ..... 219/69 C; 219/69 M; 219/69 P; 315/225

[58] Field of Search ..... 219/69 C, 69 M, 69 P, 219/69 R; 315/225, 174

[56] References Cited

U.S. PATENT DOCUMENTS

| | | | |
|---|---|---|---|
| 3,018,411 | 1/1962 | Webb | 219/69 P |
| 3,264,517 | 8/1966 | Ullmann et al. | 315/174 |
| 3,277,338 | 10/1966 | Webb | 219/69 P |
| 3,439,145 | 4/1969 | Sennowitz | 219/69 P |
| 3,614,368 | 10/1971 | Lobur | 219/69 P |
| 3,624,337 | 11/1971 | Kauffman | 219/69 P |

*Primary Examiner*—Bruce A. Reynolds
*Attorney, Agent, or Firm*—Karl F. Ross

[57] ABSTRACT

A system for controlling machining pulse on-off time to limit gap power in response to a short or an open circuit machining gap condition in electrical machining systems wherein a multivibrator applies a preset on-off time at an electronic switch between the power supply and the gap. The condition detected at the gap in the form of an electrical signal is delivered via a delay network to a control circuit adapted to shunt one of the impedances of the resistance-capacitance network of the multivibrator.

19 Claims, 4 Drawing Figures

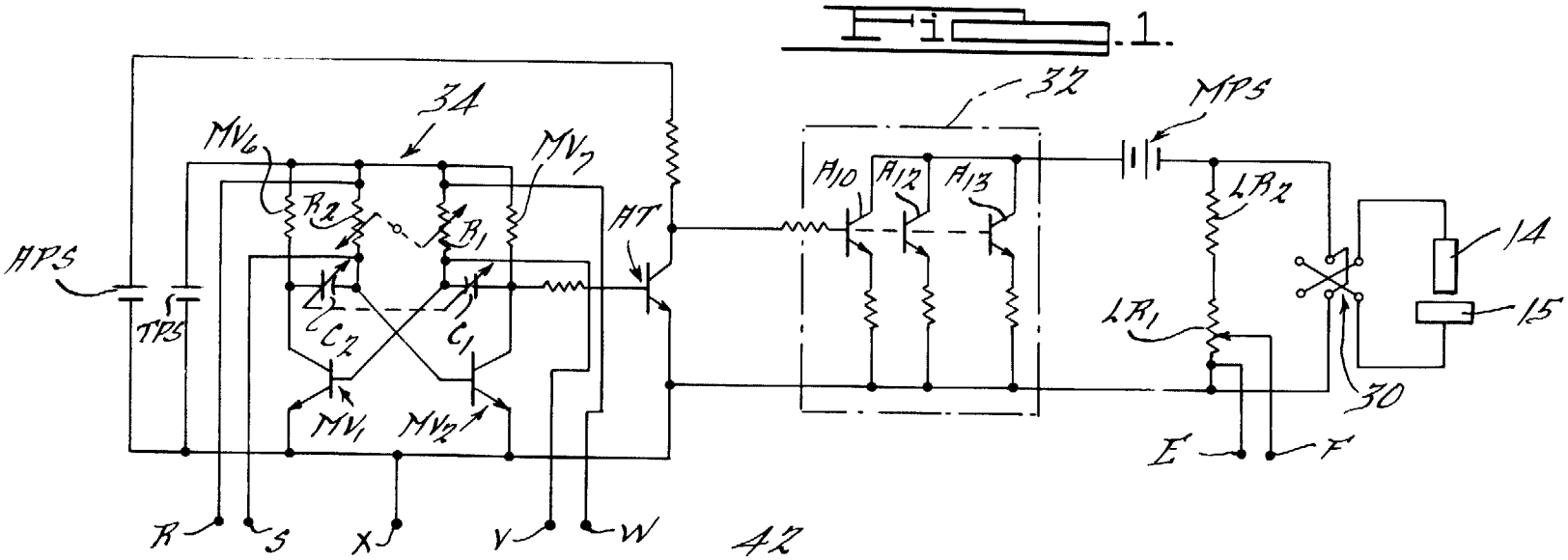
Fig. 1.
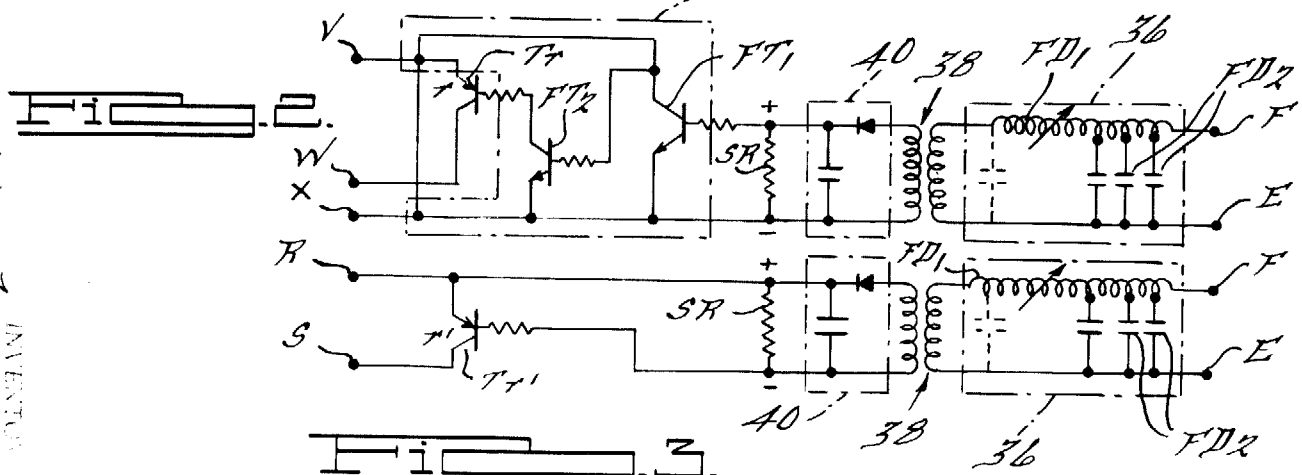
Fig. 2.
Fig. 3.
INVENTOR
Kiyoshi Inoue
BY
M K Murphy
ATTORNEY.

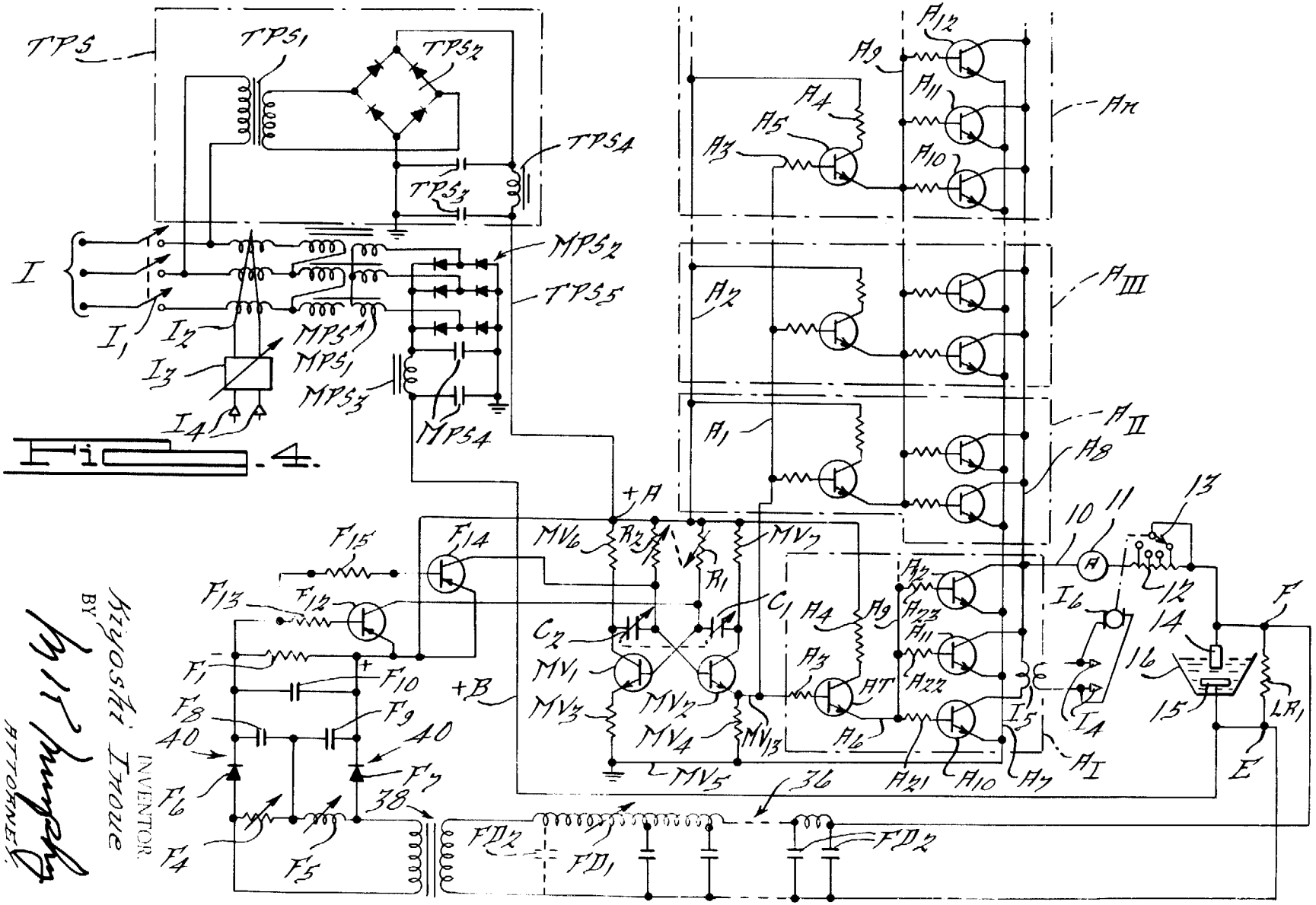
INVENTOR.
Kiyoshi Inoue
BY
M K Murphy
ATTORNEY.

ELECTRICAL DISCHARGE MACHINING PULSE CONTROL METHOD AND APPARATUS

Matter enclosed in heavy brackets [ ] appears in the original patent but forms no part of this reissue specification; matter printed in italics indicates the additions made by reissue.

CROSS-REFERENCE TO RELATED APPLICATION

This application is a continuation-in-part of my U.S. application Ser. No. 493,473, filed Oct. 6, 1965, and entitled "Solid-State Pulse Generator for Electric-Discharge Machining," now U.S. Pat. No. 3,360,683 issued Dec. 26, 1967.

BACKGROUND OF THE INVENTION

The field to which my invention relates is that generally denoted as electrical machining. Included in this field are electrical discharge machining, electrochemical machining and electrochemical discharge machining in which processes metal removal is accomplished by passing of discrete electrical impulses across a coolant filled gap. In electrical discharge machining, the coolant is a dielectric fluid such as kerosene or transformer oil. The process and apparatus of electrical discharge machining are explained and shown in my U.S. Pat. No. 3,054,931, issued Sept. 18, 1962 and entitled "Electric Power Supply Apparatus for Electric Discharge Machining." The process of electrochemical machining is explained and shown in my U.S. application Ser. No. 316,955, filed on Oct. 17, 1963 (now U.S. Pat. No. 3,357,912, issued Dec. 12, 1966) while that of electrochemical discharge machining is disclosed in my co-pending U.S. application Ser. No. 475,375, filed on July 28, 1965 *(now U.S. Pat. No. 3,616,343)*. In each of these electrical machining processes, an electrode servo feed system is employed to maintain an optimum gap spacing between electrode and workpiece. A liquid coolant in the form of a dielectric or electrolyte, depending on the process used, is circulated through the gap continuously during the machining operation. If the initial downfeed is made with too high a power pulse input to the gap, damage can be caused to workpiece, electrode or both. Provision is made by the present invention to provide for current reduction by concomitantly or separately increasing pulse off-time and decreasing pulse on-time during gap open circuit. When the gap becomes too narrow or is bridged or contaminated by eroded particles, an abnormal condition called "gap short circuit" can arise. My invention is effective in controlling all the foregoing types of electrical machining where a succession of power pulses is utilized and the variation in dimension and condition of the machining gap occurs from time to time. While the present invention is described in terms of transistor switch circuitry, my invention is not so limited, but is equally applicable to any electronic switch arrangement. By "electronc switch" I mean any electronic control device having three or more electrodes comprising at least two principal or power electrodes acting to control current flow in the power circuit, the conductivity between the principal electrodes being determined by a control electrode within the switch whereby the conductivity of the power circuit is regulated statically or electrically without movement of mechanical elements within the switch. Included within this definition are vacuum tubes and transistors in which turn-on is accomplished by a control voltage applied to the control electrode and in which turn-off is accomplished automatically in response to the removal of that control voltage. Also included in the definition are devices of the gate type in which turn-on is accomplished by a control voltage applied to the control electrode which control voltage may be then removed and in which turn-off is accomplished by application of a subsequent control voltage to the control electrode. An additional class of electronic switches called electronic trigger devices falls within this definition and includes ignitrons, thyratrons and semiconductor controlled rectifiers. By "electronic trigger device" I mean any electronic switch of the type which is triggered on at its control electrode by a pulse and is turned off by reverse voltage applied for a sufficient time across its principal electrodes.

SUMMARY OF THE INVENTION

My invention provides a feedback and control circuit which regulates the machining power pulses with respect to their on-time and off-time. The control is exercised over the pulse generator after the imposition of a suitable delay interval.

BRIEF DESCRIPTION OF THE DRAWINGS

FIG. 1 is a schematic drawing of a pulse generator suitable for electrical machining;

FIG. 2 is a schematic of a circuit usable with the circuit of FIG. 1 according to the present invention for controlling machining-pulse on-time;

FIG. 3 is a schematic of a circuit usable with the circuit of FIG. 1 according to the present invention for controlling machining-pulse off-time; and FIG. 4 is a somewhat more detailed schematic of a pulse generator substantially similar to that of FIG. 1 including provision for gap open circuit pulse control.

DESCRIPTION

In FIG. 1, the basic elements of a pulse generator for an electrical machining system are shown. The machining gap lies between electrode 14 and workpiece 15 and is flooded with a coolant fluid during machining. A servo feed system, not shown, is employed to maintain substantially constant gap spacing as workpiece material is removed. A polarity reversal switch 30 is included. A power supply MPS is connected in series with the gap and the principal or power-conducting electrodes of a plurality of parallel connected switching NPN transistors $A_{10}$, $A_{12}$, $A_{13}$. The switching-transistor bank 32 may include as many transistors as are needed to meet the machining-power-output requirements. The transistors included in switching bank 32 are triggered on and off by the operation of an amplifier transistor AT. The power supply for transistor AT is shown at APS.

The machining-pulse on-time, off-time and frequency are preset and controlled through an astable multivibrator 34 including two alternately conductive transistors $MV_1$ and $MV_2$. The power supply for the multivibrator is designated as TPS. Adjustable RC networks are connected between the two transistors $MV_1$ and $MV_2$ as shown. These networks include resistors $R_1$, $R_2$ and capacitors $C_1$, $C_2$. The RC network $R_1C_1$ coupled to transistor $MV_1$ determines the basic multivibrator pulse on-time in accordance with the formula $T_{on}=KC_1R_1$. The RC network $R_2C_2$ connected to transistor $MV_2$ determines pulse off-time in accordance with the formula $T_{off}=KC_2R_2$ where K, as in the above formula, represents a circuit constant given by the design of the multivibrator. Collector resistors $MV_6$ and $MV_7$ are connected as indicated. By ganged operation of the variable resistor-capacitor components, it is possible to vary the pulse on-off time with or without altering the frequency. The frequency of the multivibrator output pulses is determined by the formula $$F=1/K(R_1C_1+R_2C_2)$$

A variable-resistance network, including fixed resistor $LR_2$ and potentiometer $LR_1$ in series arrangement is connected across the machining gap. It is the function of this network to provide a signal proportional to average gap voltage through terminals E–F for pulse feedback control as will be explained in connection with FIGS. 2 and 3 hereinafter. While the present invention involves the use of a gap voltage signal, it is possible to use gap current or power as the signal relied upon to indicate abnormal gap condition.

FIG. 2 shows one embodiment of my invention adapted to perform machining pulse on-time control independently of pulse off-time. Feedback terminals E–F are connectible to like lettered terminals of the FIG. 1 circuit. Terminals V, W and Z at the left-hand side of the drawing are connectible to like designated terminals of FIG. 1. The several stages of the feedback system include delay network 36, differentiating network 38, integrating network 40 and sensing resistor SR. The final and left-hand stage of the FIG. 2 circuit comprises a phase-reversing network 42. Delay network 36 includes a series-connected adjustable inductor $FD_1$ and a plurality of capacitors $FD_2$ coupled in a delay-line configuration with the inductor. By way of example, the delay time for electrical-discharge machining may range between 1 to 500 microseconds while a somewhat shorter delay time of from 1 to 50 microseconds may be provided for electrochemical machining. When the machining gap between electrode 14 and workpiece 15 is in normal cutting or in open circuit condition, an integrated voltage which is proportional to mean gap voltage will exist across sensing resistor SR with the polarity indicator. When short circuit or arcing occurs at the machining gap, the integrated voltage will rapidly drop in magnitude or return to zero. Phase reversing network 42 includes NPN transistor $FT_1$ having its base connected through a limiting resistor to the upper terminal of resistor SR. A second NPN transistor $FT_2$ is coupled between transistor $FT_1$ and a PNP transistor Tr as shown. Transistor Tr, when in its conductive state, places its internal resistance r across the terminals V–W to provide a total resistance between V–W of $$\frac{Rr}{R+r}$$

where R is the resistance of potentiometer $R_1$.

In the operation of the circuit, terminals V, W and X are interconnected as between FIGS. 1 and 2. A voltage appears across sensing resistor SR with the polarity shown, which voltage is proportional to the mean gap voltage. If this voltage is of a level sufficient to indicate normal gap cutting or gap open circuit condition, transistor $FT_1$ will be turned on with conduction from power supply TPS occurring through its collector-emitter electrodes. Transistors $FT_2$ and channelling transistor Tr will both be rendered non-conductive.

In the other condition, when voltage across sensing resistor SR has fallen to zero or drastically dropped responsive to gap short circuit or arcing condition, transistor $FT_1$ will be turned off. This will render transistor $FT_2$ conductive through power supply TPS whereby channelling transistor Tr becomes conductive with the resultant effect of its internal resistance r.

FIG. 3 represents another embodiment of the feedback control system also connectible to the FIG. 1 circuit. This embodiment relates to off-time control of the multivibrator and of the machining power pulses. The several stages of the feedback system are like those of the FIG. 2 circuit and are similarly designated. The off-control system of the FIG. 3 circuit, however, does not include phase reversing network 42. The channelling transistor is designated as Tr′ with its internal resistance r′. Terminals R–S are connectible to the like designated terminals of FIG. 1. Responsive to the magnitude of the voltage developed across sensing resistor SR, transistor Tr′ will be maintained conductive or non-conductive to control the multivibrator off-time duration.

FIG. 4 shows a still further embodiment of my invention. This embodiment relates to machining pulse on-off time control responsive to gap open circuit condition which may be combined with the short circuit control systems of FIGS. 2 and 3. The transistorized pulse generator is shown in somewhat more complete detail than in the drawing of FIG. 1. Machining power supply MPS receives a three-phase alternating current input I through a switch $I_1$. Included in the input lines is a three-phase saturable core reactor $I_2$ whose control voltage is furnished by a control unit $I_3$ having input lines $I_4$. The main power supply MPS comprises a three-phase step-down transformer $MPS_1$ and a full-wave rectifier $MPS_2$ whose negative output terminal is grounded while the positive terminal is connected through the smoothing choke $MPS_3$ and filter capacitors $MPS_4$ to workpiece 15 located within workpan 16. Electrode 14 is juxtaposed with workpiece 15 while a flow of dielectric is maintained through the gap by a circulation system as is well known to the art.

The power supply TPS for the multivibrator includes a single-phase transformer TPS and a rectifier bridge $TPS_2$ whose negative side is grounded while its positive terminal is coupled to transistor lead +A through filter choke $TPS_4$ and a pair of filter capacitors $TPS_3$ with the output lead being designated $TPS_5$.

The solid-state multivibrator MV for triggering the switching transistors comprises a pair of NPN transistors $MV_1$, $MV_2$ whose emitters are connected to ground through bias resistors $MV_3$ and $MV_4$, the ground lead being shown as $MV_5$. The high voltage side of transistor power supply TPS is applied to the multivibrator transistors through collector resistors $MV_6$ and $MV_7$ while cross coupled RC circuits comprising $R_1C_1$ and $R_2C_2$ serve to control the conduction time of the multivibrator MV in the manner already set forth in connection with the circuit of FIG. 1.

The pulse output train from the multivibrator is taken from output line $MV_{13}$ and applied to the main signal line $A_I$ of a plurality of electronic switching circuits $A_I$, $A_{II}$, $A_{III}$ . . . $A_n$, the actual number being determined in accordance with the number of switching transistors per circuit, the individual current carrying capacity of each transistor, and the total current to be delivered during the machining pulses.

Each of the electronic switch circuits $A_I$, $A_{II}$ . . . $A_n$ comprises a multiplicity of switching transistors $A_{10}$, $A_{11}$, $A_{12}$ whose emitter-collector electrodes are connected in parallel across leads $A_7$ and $A_8$, the former being connected to ground via lead $MV_5$ while the latter is connected to electrode 14 through diode 10, ammeter 11 and variable resistor 12. The collector-emitter electrodes of transistors $A_{10}$, $A_{11}$, $A_{12}$ are thus connected in series between ground and electrode 14 while the machining current is applied to workpiece 15 by the line +B. Each of transistors $A_{10}$, $A_{11}$, $A_{12}$ of each switching circuit $A_I$, $A_{II}$, $A_{III}$ . . . $A_n$ has its control electrode, i.e., base in series circuit with a resistor $A_{21}$, $A_{22}$, $A_{23}$, respectively, and connected to a signal lead $A_9$ to which the output terminal $A_6$ of a respective amplifier transistor AT is connected. Each of the transistors AT has its base resistor $A_3$ connected to the signal line $A_1$. The collectors of the transistors AT may be connected through bias resistors $A_4$ to the high voltage side of the transistor power supply TPS along line +A or to the plus positive side of a separate power supply such as APS shown in the circuit of FIG. 1.

In the FIG. 4 circuit, machining power is controlled by detecting the frequency of discharge by a frequency meter or other means responsive to the repetition rate of gap discharges. Since the repetition rate is proportional to the mean current, it is possible to use the latter as the measure of frequency for control of the main power supply MPS. For this purpose, a current transformer $I_5$ can be connected in one branch of the transistor switching system so that it need have only the capacity of that branch. Current transformer $I_5$ has its terminals $I_4$ connected with control unit $I_3$ in the upper left-hand side of the drawing. Control unit $I_3$ generates the direct current control voltage applied to saturable reactor $I_2$. Thus, the dicharge power may be maintained constant by control unit $I_3$ which compares the output of current transformer $I_5$ with an adjustable reference to generate the control voltage for saturable reactor $I_2$. Another type of control is possible by varying the resistance of the series circuit in which electrode 14 is connected. For this purpose, tapped resistor 12 is provided, while a switch 13 is designed to selectively shunt the resistor sections as controlled by a rotary solenoid $I_6$ energized by current transformer $I_5$. As the current increases beyond the desired level, solenoid $I_6$ is energized to shunt less of resistor 12.

The feedback control networks of the FIG. 4 circuit include delay network 36 which includes capacitor $FD_2$ and variable inductor $FD_1$ in an arrangement like that shown in the FIGS. 2 and 3 circuits. Coupled across the output of differentiating network 38 is the series combination of resistor $F_4$ and adjustable inductor $F_5$. The integrating network 40 includes diodes $F_6$, $F_7$ and capacitors $F_8$, $F_9$ with the series combination of diode $F_6$ and capacitor $F_8$ connected across resistor $F_4$ and the series combination of diode $F_7$ and capacitor $F_9$ connected across inductor $F_5$ in the manner shown. An intermediate capacitor $F_{10}$ is connected as shown and shunted by sensing resistor $F_1$. A pair a PNP transistors $F_{12}$ and $F_{14}$ are coupled to the multivibrator resistors $R_1$ and $R_2$, respectively, for control of pulse on-off time in a manner similar to that previously indicated in connection with FIGS. 2 and 3. Current limiting resistors $F_{13}$, $F_{15}$ are connected to the bases of transistors $F_{12}$ and $F_{14}$ as shown.

In the operation of FIG. 4 circuit, the voltage appearing across capacitor $F_8$ in the integrating network indicates the level of mean gap voltage and is represented by the formula RI where R designates the resistance of resistor $F_4$ and I designates current level of the differentiated signal of transformer 38. The voltage appearing across capacitor $F_9$ is represented by the formula nLI where n denotes the frequency of the differentiated input signal; L denotes the magnitude of inductance and I denotes the current level of the differentiated signal. In this connection, it must be stated that in electrical-discharge machining, to which this embodiment is particularly related, normal gap cutting involves the occurrence of harmonics of relatively high frequency. Thus, when the gap is held in normal cutting condition, the voltage nLI developed across inductor $F_5$ will be raised to higher level with the occurrence of higher frequency of acceptable discharge harmonics. In the gap open circuit condition, the voltage will drop to a reduced level will impression across the machining gap of a succession or train of pulses of a frequency determined by the setting of the multivibrator. Now the voltage difference between RI and nLI will be reflected across intermediate capacitor $F_{10}$ and across sensing resistor $F_1$. The integrating network of the FIG. 4 circuit is so designated that sensing resistor $F_1$ has a polarity as indicated with the voltage difference (nLI–RI) only when the gap is in the normal cutting condition when sparks are occurring with harmonics of frequencies substantially higher than the frequency of the multivibrator pulse train output. This is accomplished by presetting the relative magnitudes of the variable resistance R of $F_4$ and the variable inductance L of $F_5$. When the gap changes to the open circuit condition, the voltage signal is developed across sensing resistor $F_1$ with a different polarity (RI–nLI). In gap short circuit condition, no voltage signal would be created across resistor $F_1$. In connection the terminals of sensing resistor $F_1$ with channelling transistors $F_{12}$ and/or $F_{14}$, consideration must be given to the inclusion of a phase reversal network. When pulse on-time narrowing in short circuit condition as well as in gap open circuit condition is desired, a phase reversing network such as network 42 of FIG. 2 must be incorporated between the output of resistor $F_1$ and transistor $F_{14}$ in the manner shown in that figure. Off-time widening can be accomplished by direct connection of the terminals of resistor $F_1$ with the base and emitter electrodes of transistor $F_{12}$ as shown in FIG. 4. It is similarly possible to provide simultaneous on-time narrowing and off-time widening with or without frequency control. The present invention is not limited to the single type of phase-reversing network shown, but may include any conventionally known type of phase reversing network.

DESCRIPTION OF OPERATION

A description of operation will now be made with particular reference to FIGS. 1 and 2. A tabular representation of the circuit operation conditions will be helpful in the understanding of the present invention. When terminals V, W, X of FIG. 2 are connected with like lettered terminals of FIG. 1, respectively, the circuit will provide on-time control of the multivibrator and of the machining pulses furnished to the gap in response to electrical conditions of the machining gap without any effect of the off-time duration as shown in Table I below.

TABLE I

| | Normal or open gap condition | Short circuit condition |
|---|---|---|
| Voltage level across resistor SR | V | O. |
| Transistor $FT_1$ | Conductive | Non-conductive. |
| Transistor $FT_2$ | Non-conductive | Conductive |
| Transistor Tr | Non-conductive | Conductive (r). |
| Total resistance across $R_1$ | $R_1 > R_1r/(R_1 + r)$ | |
| Total resistance across $R_2$ | $R_2 = R_2$ | |
| On-duration of output pulses | $kC_1R_1 > KC_1R_1r/R_1 + r)$ | |
| Off-duration of output pulses | $kC_2R_2 = kC_2R_2$ | |
| Repetition rate of output pulses | $1/k(C_2R_1 + C_2R_2) < 1/k(C_1R_1r/(R_1 + r) + C_2R_2)$ | |

As is apparent from Table I, pulse narrowing is carried out when the machining gap is approaching a short circuit or arcing condition. This is accomplished without change of the pulse off-time and with corresponding increase of pulse frequency.

When terminals R and S of FIG. 3 are connected to like lettered terminals of FIG. 1, respectively, operation in the reverse mode to that above described will be effected. Off-time will be controlled as shown below in Table II.

TABLE II

| | Normal or open gap condition | Short circuit condition |
|---|---|---|
| Voltage level across resistor SR | V | O. |
| Transistor Tr | Conductive (r') | Non-conductive |
| Total resistance across $R_1$ | $R_1 = R_1$ | |
| Total resistance across $R_2$ | $R_2r'/(R_2+r') < R_2$ | |
| On-duratin of output pulses | $kC_1R_1 = kC_1R_1$ | |
| Off-duration of output pulses | $kC_2R_2r'/(R_2+r') < kC_2R_2$ | |
| Repetition rate of output pulses | $1/k(C_1R_1 + C_2R_2r') > 1k(C_1R_1 + C_2R_2)$ | |

In the embodiment of FIG. 3, the basic on-off time ratio and frequency are determined by presetting the multivibrator parameters—$R_1$, $R_2$, $C_1$ and $C_2$ together with the selection of the internal resistance r' of the transistor Tr'. It is further possible to combine the two arrangements shown above in connection with FIGS. 1, 2, and 3 to effect simultaneous on-time narrowing and off-time widening, with or without substantial change of frequency. It is further possible to control only the repetition rate while maintaining a constant on-off ratio.

I claim:

1. In an apparatus for machining a conductive workpiece by passing electrical-discharge pulses between a tool electrode and said workpiece across a dielectric-coolant filled gap, a machining power circuit for supplying said pulses to said gap, said machining power circuit comprising a power supply; a first electronic switch having a pair of principal electrodes connected in series with said power supply and said gap, and a control electrode; a multivibrator having its output connected to the control electrode of said first switch for operating it with predetermined on-off time, said multivibrator including a pair of second electronic switches biased and coupled for alternate operation while having respective control electrodes and at least one resistance-capacitance network connected to the control electrode of one of said pair of said second switches for controlling said on-off time, said network having a time-constant-determining resistance; sensing means connected to said gap for providing an electrical output signal responsive to gap short circuit condition; control means for altering the resistance of said network to decrease switch on-time responsive to said signal; and delay means coupled between said sensing means and said control means for delaying its operation a predetermined time interval after occurrence of said condition, said control means comprising a third electronic switch having its principal electrodes connected in shunt with said time-constant-determining resistance of said network for varying the effective magnitude of said time constant and a control electrode connected to said gap through said delay means.

2. In an apparatus for machining a conductive workpiece by passing electrical-discharge pulses between a tool electrode and the workpiece across a dielectric-coolant-filled gap, comprising a machining-power circuit for supplying said pulses to said gap comprising a power supply, and a periodically operated electronic switch of preset on-off time having its principal electrodes connected in series with said power supply and said gap for providing said pulses thereto and having a control electrode, the improvement which comprises sensing means connected to said gap for providing an electrical output signal responsive to gap open circuit condition, control means operatively connected to the control electrode of said switch for decreasing its on-time responsive to said signal, and delay means coupled between said sensing means and said control means for delaying its operation a predetermined time interval after occurrence of said condition.

3. The improvement defined in claim 2 wherein:

said sensing means includes a voltage-dividing resistor connected across said gap;

said delay means includes a delay line having an inductance with one terminal connected to said voltage-dividing resistor and a multiplicity of capacitors having corresponding terminals connected to said voltage-dividing resistor and tapped to said inductance; and said control means includes a differentiating network connected across another terminal of said inductance and said corresponding terminals of said capacitors, and at least one amplifying transistor connected between said differentiating network and said control electrode.

4. The improvement defined in claim 3, further comprising an integrating network connected between said differentiating network and said amplifying transistor.

5. The improvement defined in claim 4 wherein said periodically operated electronic switch comprises a plurality of parallel-triggered switching transistors each connected to said gap through a respective group of power transistors.

6. The improvement set forth in claim 2 in which said sensing means comprises a variable inductance for providing an output signal which is a function of relatively high frequency discharges occurring across the gap during normal cutting.

7. In an apparatus for machining a conductive workpiece by passing electrical-discharge pulses between a tool electrode and said workpiece across a dielectric-coolant-filled gap, a machining power circuit for supplying said pulses to said gap, said machining power circuit comprising a power supply, a first electronic switch having a pair of principal electrodes connected between said power supply and said gap and a control electrode, a multivibrator having its output connected to the control electrode of said first switch for operating it with predetermined on-off time, said multivibrator including a pair of second electronic switches biased and coupled for alternate operation, each of said pair of second switches having a respective control electrode connected to a different resistor-capacitor network, sensing means connected to said gap for providing an electrical output signal responsive to gap short circuit condition, a first control means connected between said sensing means and one of said resistor-capacitor networks for changing its time constant and decreasing pulse on-time, a second control means connected between said sensing means and the other of said resistor-capacitor networks for changing its time constant and increasing pulse off-time, and delay means connected between said sensing means and each of said control means for controlling its operation a predetermined time interval after occurrence of said condition.

8. The method of electrical discharge machining comprising the steps of periodically connecting a power supply to a machining gap through an electronic switch to provide machining pulses of a predetermined on-off time and frequency thereto, wherein the improvement comprises sensing for the presence and absence of substantially higher frequency discharges across said gap, providing a control output signal responsive to the absence of said high frequency discharges, such condition being representative of gap open circuit and employing said signal to increase the off-time and decrease the on-time of said machining pulses.

9. In an apparatus for machining a conductive workpiece by passing electrical pulses between a tool electrode and a workpiece across a liquid-filled gap, the improvement which comprises:

a power supply;

periodically operable electronic switch means having at least one control electrode and at least one pair of principal electrodes in series between said power supply and said gap for supplying said pulses thereto;

periodically operable multivibrator means having an output connected to said control electrode for triggering said switch means with preset on-off time, said multivibrator means including at least one resistance-capacitance network having a time-constant-determining impedance for controlling on-off time;

sensing means connected across said gap for providing an electrical output signal responsive to a condition of said gap;

control means between said sensing means and said impedance and bridged thereacross for altering the effective impedance value and the time constant of said resistance-capacitance network in accordance with said signal; and delay means between said sensing means and said control means for delaying operation of said control means for a predetermined time interval after occurrence of said condition.

10. In an apparatus for machining a conductive workpiece by passing electrical pulses between a tool electrode and a workpiece across a liquid-filled gap, the improvement which comprises a power supply:

periodically operable electronic switch means including at least one first electronic switch having a control electrode and a pair of principal electrodes and a plurality of parallel-connected second electronic switches each having a control electrode connected in circuit with the principal electrodes of said first switch and a pair of principal electrodes connected in circuit with said power supply and said gap for supplying said pulses thereto;

periodically operable multivibrator means having an output connected to said control electrode of said first switch for triggering said switch means with preset on-off time, said multivibrator including a pair of alternately conductive electronic switches and respective resistance-capacitance networks in circuit with each of said alternately operable electronic switches, each of said resistance-capacitance networks having a respective time-constant-determining impedance for controlling on-off time;

sensing means connected across said gap for providing an electrical output signal responsive to a condition of said gap;

control means between said sensing means and at least one of said impedance and bridged thereacross for shunting the bridged impedance and altering the effective impedance value and the time constant of the corresponding resistance-capacitance network in accordance with said signal; and delay means between said sensing means and said control means for delaying operation of said control means for a predetermined time interval after occurrence of said condition.

11. The improvement defined in claim 10 wherein:

said multivibrator means is a transistor multivibrator;

said alternately operable electronic switches are transistors having bases tied to the respective resistance-capacitance networks; and the impedance bridged by said control means is a resistor of the corresponding resistance-capacitance network.

12. The improvement defined in claim 11 wherein said power supply includes:

an alternating-current source;

a saturable reactor in series with said source;

a rectifier in series with said saturable reactor and said source and connected between said saturable reactor and said periodically operable electronic switch means; and further control means responsive to the electrical current flow through said gap for controlling said saturable reactor.

13. The improvement defined in claim 11 wherein said control means includes:

a pair of switching transistors each having its principal electrodes connected across one of said impedances and respective control electrodes;

an integrating network connected to the control electrodes of said switching transistors; and a differentiating network connected between said delay means and said integrating network.

14. In a method of electrical discharge machining of a conductive workpiece with a tool electrode across a machining gap wherein a power supply is periodically connected to the machining gap through an electronic switch to provide machining pulses of a predetermined on-off time frequency to said gap and the discharge includes waveform harmonics of a higher frequency than that of said machining pulses and representative of a normal-gap cutting condition, the improvement which comprises the steps of sensing selected relatively high-frequency harmonics representative of the normal-gap cutting condition across said gap; deriving an electrical control signal as a function of the frequency level of said harmonics; and controlling the pulse on-off time with said signal.

15. In an apparatus for electrically machining a conductive workpiece by passage of electrical machining pulses across a coolant-filled gap between a tool electrode and said workpiece, said apparatus comprising a machining power circuit for supplying said pulses to said gap and including a power supply, a periodically operated electronic switch of preset on-off time and principal electrodes connected in series with said power supply and said gap, said electronic switch having at least one of its on-time and off-time parameters controllable, the improvement which comprises sensing means continuously connected to said gap for providing an electrical output signal continuously responsive to gap condition, control means between said sensing means and said switch for varying one of said parameters in response to said signal, and delay means between said sensing means and said control means for delaying its operation a predetermined time interval after occurrence of said abnormal gap condition.

16. The improvement defined in claim 15 wherein said control means includes an integrating circuit network responsive to the continually sensed gap condition for varying one of said parameters.

*17. An EDM apparatus of the type comprised in part of a power supply producing periodic output machining pulses for generating electrical discharges across a machining gap formed between an electrically conductive tool and an electrically conductive workpiece, wherein the improvement comprises:*

*a. means connected to the tool and workpiece for detecting the presence and absence of a noise signal during the discharges; and*

*b. means connected between the detecting means and the power supply for modifying the production of the machining pulses in response to detecting the absence of the noise signal.*

*18. An EDM apparatus of the type comprised in part of a power supply producing periodic output machining pulses for generating electrical discharges having a predetermined energy level across a machining gap formed in a dielectric medium between an electrically conductive tool and an electrically conductive workpiece, wherein the improvement comprises:*

*(a) means electrically connected to the tool and workpiece for detecting the absence of a noise signal during the electrical discharges;*

*(b) means connected between the detecting means and the power supply for changing the energy level of the electrical discharges in response to detecting the absence of said noise signal.*

*19. An EDM process for removing metal having the steps of initiating a spark discharge across a machining gap, melting a volume of metal and terminating the spark discharge after a predetermined period of time commensurate with a predetermined energy level, wherein the improvement comprises:*

*(a) detecting the absence of a noise signal across the gap during the spark discharge; and*

*(b) reducing the energy level of succeeding spark discharges for a predetermined period of time.*

* * * * *